(12) United States Patent
McKenney

(10) Patent No.: US 9,940,290 B2
(45) Date of Patent: *Apr. 10, 2018

(54) HANDLING CPU HOTPLUG EVENTS IN RCU WITHOUT SLEEPLOCKS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/886,518

(22) Filed: Oct. 19, 2015

(65) Prior Publication Data

US 2017/0097917 A1    Apr. 6, 2017

Related U.S. Application Data

(63) Continuation of application No. 14/873,792, filed on Oct. 2, 2015.

(51) Int. Cl.
*G06F 13/00* (2006.01)
*G06F 13/40* (2006.01)
(Continued)

(52) U.S. Cl.
CPC .......... *G06F 13/4081* (2013.01); *G06F 3/065* (2013.01); *G06F 3/068* (2013.01);
(Continued)

(58) Field of Classification Search
None
See application file for complete search history.

(56) References Cited

U.S. PATENT DOCUMENTS

| 5,442,758 A | 8/1995 | Slingwine et al. |
| 5,608,893 A | 4/1997 | Slingwine et al. |

(Continued)

OTHER PUBLICATIONS

P. McKenny et al., "Read-Copy Update: Using Execution History to Solve Concurrency Problems," PDCS, Oct. 1998, 11 pages.

(Continued)

*Primary Examiner* — Henry Tsai
*Assistant Examiner* — Dean Phan
(74) *Attorney, Agent, or Firm* — Walter W. Duft

(57) ABSTRACT

Read-copy update (RCU) grace period initialization and CPU hotplugging are synchronized without a sleeplock. Periodic RCU grace period initialization includes, for each node of a combining tree, copying a first bitmask indicating online/offline status of a set of CPUs to a second bitmask indicating RCU quiescent state status of the CPUs. Periodic CPU hotplug operations include indicating CPU online/offline status to leaf nodes associated with the CPUs. This status is indicated without manipulating any bits in the first bitmask of the leaf nodes. Prior to each RCU grace period initialization, RCU grace period pre-initialization is performed at each leaf node. The RCU grace period pre-initialization includes (1) updating the first bitmask to account for the CPU hotplug operations, and (2) if this results in the first bitmask transitioning between fully cleared and not-fully cleared states, the state change is conditionally propagated to a higher level node.

7 Claims, 13 Drawing Sheets

(51) Int. Cl.
*G06F 3/06* (2006.01)
*G06F 13/16* (2006.01)
*G06F 13/42* (2006.01)

(52) U.S. Cl.
CPC ........ *G06F 3/0619* (2013.01); *G06F 13/1663* (2013.01); *G06F 13/4234* (2013.01)

(56) References Cited

U.S. PATENT DOCUMENTS

| | | | |
|---|---|---|---|
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |
| 7,191,272 | B2 | 3/2007 | McKenney |
| 7,287,135 | B2 | 10/2007 | McKenney et al. |
| 7,353,346 | B2 | 4/2008 | McKenney et al. |
| 7,349,879 | B2 | 6/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 2008/0040720 | A1* | 2/2008 | McKenney ........... G06F 9/4881 718/103 |
| 2008/0082532 | A1* | 4/2008 | McKenney ......... G06F 9/30087 |
| 2012/0324170 | A1 | 12/2012 | McKenney |
| 2012/0331237 | A1 | 12/2012 | McKenney |
| 2013/0061071 | A1 | 3/2013 | McKenney |
| 2013/0138896 | A1 | 5/2013 | McKenney |
| 2013/0151798 | A1 | 6/2013 | McKenney |
| 2013/0152095 | A1 | 6/2013 | McKenney |
| 2014/0281295 | A1 | 9/2014 | McKenney |
| 2014/0379676 | A1 | 12/2014 | McKenney |
| 2014/0380084 | A1 | 12/2014 | McKenney |
| 2015/0153817 | A1 | 6/2015 | McKenney |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document Slab_Destroy_By_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory22 multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney,"The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenny, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.

(56) References Cited

OTHER PUBLICATIONS

P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
Podzimek, Andrej, "Read-Copy-Update for OpenSolaris," PhD diss., Diploma Thesis, Charles University in Prague, Faculty of Mathematics and Physics, 2010, 90 pages.
Miao, Tianxiang, et al., "FlexCore: Dynamic Virtual Machine Scheduling Using VCPU Ballooning," Tsinghua Science and Technology vol. 20, No. 1, 2015, pp. 7-16.
Panneerselvam, Sankaralingam, et al., "Chameleon: Operating System Support for Dynamic Processors," ACM SIGPLAN Notices 47, No. 4, 2012, pp. 99-110.
International Business Machines Corporation, "List of IBM Patents or Patent Applications Treated as Related", Oct. 15, 2015, 2 pages.

* cited by examiner

HANDLING CPU HOTPLUG EVENTS IN RCU WITHOUT SLEEPLOCKS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

RCU implementations may use a combining tree to track quiescent states, with bitmasks at each level of the tree indicating which CPU's quiescent states are required in order to end a grace period. These bits are set at the beginning of each RCU grace period and cleared by CPUs when they pass through quiescent states. This is known as hierarchical RCU. In hierarchical RCU implementations that support CPU hotplugging, additional bitmasks are provided at each level to advise RCU which CPU's are offline, and whose quiescent states are therefore not required to end a grace period. When CPU hotplug events occur, these bits are set or cleared to respectively indicate CPU online or offline status.

In current versions of the Linux® kernel, the RCU combining tree used for quiescent state tracking is implemented using an rcu_state structure that contains a tree of rcu_node structures embedded as a linear array. FIG. 4 illustrates an example two-level tree hierarchy that includes two bottom-level leaf rcu_node structures and a single top level root rcu_node structure. In a larger system with many CPUs, the combining tree could be expanded to include one or more additional levels of rcu_node structures.

The qsmi bitmasks in FIG. 4 represents each rcu_node structure's ->qsmaskinit bitmask field indicating which CPUs are online or offline. The qsm bitmasks represent each rcu_node structure's ->qsmask bitmask field indicating which CPUs need to report a quiescent state before the current grace period can end. The root rcu_node structure in FIG. 4 is associated with two lower level leaf rcu_node structures. The root rcu_node structure's ->qsmaskinit and ->qsmask fields thus have two bits apiece, one for each of the two leaf rcu_node structures that report to it.

Each leaf rcu_node structure in FIG. 4 is associated with a two CPUs, each of which is represented by a corresponding per-CPU rcu_data structure. The leaf rcu_node structure's ->qsmaskinit and ->qsmask fields thus have two bits apiece, one for each of the two rcu_data structures that report to it. Among other thing, the rcu_data structures are used to maintain certain per-CPU RCU data, such as lists of RCU callbacks.

The CPUs in FIG. 4 periodically access their assigned leaf rcu_node structure to record RCU quiescent states by clearing their respective bits in the leaf rcu_node structure's ->qsmask field. When all of a leaf rcu_node structure's CPUs have passed through a quiescent state (and assuming the leaf rcu_node structure is not tracking any blocked RCU reader tasks), the last CPU to clear its bit in the leaf rcu_node structure's ->qsmask field propagates this state to the root rcu_node structure and clears a bit in the latter's ->qsmask field that corresponds to the leaf rcu_node structure. Or, if there are more than two levels in the combining tree, a bit will be cleared in the ->qsmask field of an rcu_node structure at the next higher level of the tree. Eventually, all of the root rcu_node structure's ->qsmask bits will cleared, at which point the current grace period may end.

The CPU's in FIG. 4 also periodically access their assigned leaf rcu_node structure to record CPU hotplug events by either setting or clearing their respective bits in the leaf rcu_node structure's ->qsmaskinit field. If all of the CPUs associated with a leaf rcu_node structure go offline (and assuming the leaf rcu_node structure is not tracking any blocked RCU reader tasks), the last CPU to clear its bit in the leaf rcu_node structure's ->qsmaskinit field propagates this state to the root rcu_node structure and clears a bit in the latter's ->qsmaskinit field that corresponds to the leaf rcu_node structure. Or, if there are more than two levels in the combining tree, a bit will be cleared in the ->qsmaskinit field of an rcu_node structure at the next higher level of the tree. Ultimately, by the time the current RCU grace period ends, the ->qsmaskinit field in the root rcu_node structure will have some of its bits cleared to reflect the fact that there are offline CPUs in the system. In order to avoid waiting for quiescent states from these online CPUs during the next RCU grace period, initialization of the new RCU grace period includes copying the ->qsmaskinit field to the ->qsmask field in each rcu_node structure of the combining tree. The new RCU grace period will thus only wait on CPUs that were online at the start of that grace period.

FIG. 4 shows a newly initialized grace period following the bitmask copying operation. As would be expected, the values of the ->qsmask and qsmaskinit fields are identical. The leftmost leaf rcu_node structure's fields show CPU0 online (qsmi) and being waited on (qsm) and CPU1 offline and not being waited on. Similarly, the rightmost rcu_node structure shows both CPU2 and CPU3 online and being waited on. The root rcu_node structure shows that each of the leaf rcu_node structures have at least one CPU that is online and being waited on.

An additional complication is posed by preemptible versions of RCU, where tasks can be preempted while running in an RCU read-side critical section. For example, FIG. 5 illustrates a scenario where Tasks A and B are preempted while running on CPU0, and then CPU0 goes offline. Although RCU does not need to wait on anything further from CPU0 and CPU1 in order to end the current grace period, it still needs to wait on Tasks A and B. To handle this situation, tasks A and B are queued on an rcu_node field called ->blkd_tasks, represented by the b tags on the leaf rcu_node structures. The leftmost leaf rcu_node structure's ->qsmask and ->qsmaskinit fields are both "0 0," indicating that RCU need not wait on the now-offline CPU0 and CPU1, but the leftmost ->qsmask and ->qsmaskinit fields in the root rcu_node structure are both set to "1 1" to indicate that RCU still needs to wait on the tasks on the leftmost leaf rcu_node structure's ->blkd_tasks list. Propagation of the ->qsmask and ->qsmaskinit field state of the leftmost rcu_node structure to the root rcu_node structure is deferred until these tasks have completed and the ->blkd_tasks list is cleared.

Synchronization between RCU grace-period initialization and CPU hotplug operations (online and offline) is important. RCU grace-period initialization typically traverses the rcu_node tree breadth-first, from the root toward the leaves, copying the ->qsmaskinit fields to the ->qsmask fields in the rcu_node structures at each level. In contrast, CPU hotplug operations typically modify the ->qsmaskinit fields from the leaves to the root, setting bits in the ->qsmaskinit fields to note a newly onlined CPU and clearing them to note a newly offlined CPU. Allowing grace-period initialization to proceed concurrently with CPU hotplug bit manipulations can easily lead to confusion. For example, grace period initialization might handle the root rcu_node structure before a concurrent CPU hotplug operation reaches the root, and the CPU hotplug operation might clear a CPU's bit in the ->qsmaskinit field of one of the leaf rcu_node structures before grace period initialization reaches that leaf rcu_node structure.

An example of this is shown in FIGS. 6A-6C. FIG. 6A shows the rcu_state structure at the end of an old grace period and prior to the initialization of a new grace period.

CPU0 is online and CPU1 is offline, such that the ->qsmaskinit field in the leftmost leaf rcu_node structure is "1 0." The ->qsmask field in the leftmost leaf rcu_node structure is "0 0" because these bits were cleared during the old grace period and the new grace period has yet to be initialized. The ->qsmask field in the rightmost leaf rcu_node structure is the same, but its ->qsmaskinit field is "1 1" due to both CPU2 and CPU3 being online. In the root rcu_node structure, the ->qsmaskinit field is "1 1" to indicate there is at least one online CPU associated with each leaf rcu_node structure. The ->qsmask field in the root rcu_node structure is "0 0" because these bits were cleared during the old grace period and initialization for the new grace period has not yet started.

FIG. 6B shows the rcu_state structure after RCU grace period initialization has processed the root rcu_node structure but not the leaf rcu_node structures, and after CPU0 has gone offline and the CPU hotplug offlining operation has processed the ->qsmaskinit field in the leftmost leaf rcu_node structure, but not in the root rcu_node structure. The grace period initialization operation has copied the ->qsmaskinit field in the root rcu_node structure, whose value is "1 1," to the root rcu_node structure's ->qsmask field, such that its value changes from "0 0" (as in FIG. 6A) to "1 1." The CPU hotplug offlining operation has changed the ->qsmaskinit field in the leftmost leaf rcu_node structure from "1 0" (as in FIG. 6A) to "0 0" to reflect the offlining of CPU0.

FIG. 6C shows the rcu_state structure after RCU grace period initialization has processed the leaf rcu_nodes structures, and the CPU hotplug offlining operation has processed the ->qsmaskinit field in the root rcu_node structure. The grace period initialization operation has copied the ->qsmaskinit fields in the leaf rcu_node structures to the ->qsmask fields in those structures. In the leftmost leaf rcu_node structure, the ->qsmask field is still "0 0," and in the rightmost leaf rcu_node structure the ->qsmask field changes from "0 0" to "1 1." The CPU hotplug offlining operation has changed the ->qsmaskinit field in the root rcu_node structure from "1 1" to "0 0" in order to reflect the fact that the leftmost leaf rcu_node structure no longer has any online CPUs.

It will be appreciated that the condition of the rcu_state structure in FIG. 6C is problematic. Because CPU0 and CPU1 are both offline, the ->qsmask bit in the root rcu_node structure corresponding to the leftmost leaf rcu_node structure will never be cleared. Even if one of the offline CPUs were to inexplicably attempt to record a quiescent state, its ->qsmask bit in the leftmost leaf rcu_node structure is already zero. This zero value would tell the CPU that RCU is not expecting a quiescent state from it for the current grace period, and would prevent it from looking further up the combining tree, where RCU is in fact expecting a quiescent state. The RCU grace period will therefore never end, resulting in out-of-memory (OOM) conditions or even system hangs. It should be noted that the same issue can arise if the grace period initialization proceeds from leaf to root, and the hotplug operation proceeds from root to leaf.

To prevent these OOMs and system hangs, RCU uses an ->onoff_mutex field (see FIGS. 6A-6C) in the rcu_state structure to provide a sleeplock that prevents RCU grace-period initialization from running concurrently with CPU hotplug's ->qsmaskinit manipulations. The ->onoff_mutex sleeplock prevents changes in RCU's CPU hotplug state while the combining tree is being initialized for a new grace period. Using a sleeplock allows RCU grace-period initialization to be preempted, which is critically important on large systems. For example, a system with 4096 CPUs running a Linux® kernel with default Kconfig settings may have an RCU combining tree containing no fewer than 261 rcu_node structures, which can take more than 200 microseconds to initialize. This latency is unacceptably large for a few important applications, hence the need for RCU grace period initialization preemptability.

Unfortunately, use of the ->onoff_mutex sleeplock means that CPU hotplug bit operations on the ->qsmaskinit fields must be carried out in a preemptible context, which rules out performing CPU-offlining from the portion of the idle loop that offline CPUs go to in order to be powered off. It is highly desirable to instead carry this operation out from that portion of the idle loop, as this would eliminate RCU's current uncertainty as to exactly when a given CPU has gone offline. RCU currently assumes that it will take no longer than one jiffy (i.e., one tick of the system interrupt timer) for the offlining to complete, which is not an optimal approach. In addition, in virtualized settings, it is not unusual for a hypervisor to preempt a guest OS for far longer than on jiffy. In such situations, RCU will assume that the CPU has already gone offline when in fact it has not yet done so. Because the outgoing CPU will pass through the scheduler, which uses RCU, this can cause the scheduler to access freed data on the outgoing CPU. Applicant submits that it would be better for RCU to know exactly when a given CPU went offline, without arbitrarily chosen one jiffy timeout periods.

There is therefore a need for some mechanism that allows RCU grace period initialization to be preempted, while still properly accounting for CPU hotplug events.

SUMMARY

A method, system and computer program product are provided for that synchronize read-copy update (RCU) grace period initialization with CPU hotplugging. A combining tree is provided to track RCU grace periods and CPU hotplug activity. The combining tree includes a root node at a root level of the combining tree and a set of lower level nodes in one or more lower levels of the combining tree, the lower level nodes including a set of two or more leaf nodes at a leaf level of the combining tree, and the lower level nodes optionally further including zero or more intermediate nodes in zero or more intermediate levels of the combining tree.

Each leaf node is associated with a set of assigned CPUs and reports to an assigned higher level node in the combining tree. The higher level node will be the root node if there are two levels in the combining tree or will be one of the intermediate nodes if there are more than two levels in the combining tree. The root node is associated with a set of assigned lower level nodes. The lower level nodes will be the leaf nodes if there are two levels in the combining tree or will be one or more levels of the intermediate nodes if there are more than two levels in the combining tree.

Each node in the combining tree has a first bitmask whose bits indicate online/offline status of the CPUs, and a second bitmask whose bits indicate RCU quiescent state status of the CPUs. Each bitmask bit in the leaf nodes directly corresponds to one of the CPUs. Each bitmask bit in the higher level nodes directly corresponds to an assigned lower level node and indirectly corresponds to CPUs represented by the assigned lower level node.

RCU grace period initialization is periodically performed in which, for each node, the first bitmask is copied to the second bitmask. CPU hotplug operations are periodically performed that result in the CPUs coming online or going offline. The CPU hotplug operations indicate online or offline status of the CPUs to the associated leaf nodes to which the CPUs are assigned. This status is indicated without manipulating any bits in the first bitmask of the leaf nodes.

Prior to each RCU grace period initialization, RCU grace period pre-initialization is performed at each of the leaf nodes. The RCU grace period pre-initialization includes (1) updating the first bitmask by setting or clearing bits to account for the leaf node's assigned CPUs that have come online or gone offline as a result of the CPU hotplug operations, and (2) if updating the first bitmask results in the first bitmask transitioning from a state in which at least one bit is set to a fully cleared state, or from a fully cleared state to a state in which at least one bit is set, the state change is conditionally propagated to the leaf node's assigned higher level node by setting or clearing a bit that corresponds to the leaf node in the higher level node's first bitmask.

Access to the leaf nodes by the RCU grace period pre-initialization and the CPU hotplug operations is synchronized without using a sleeplock.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 7:
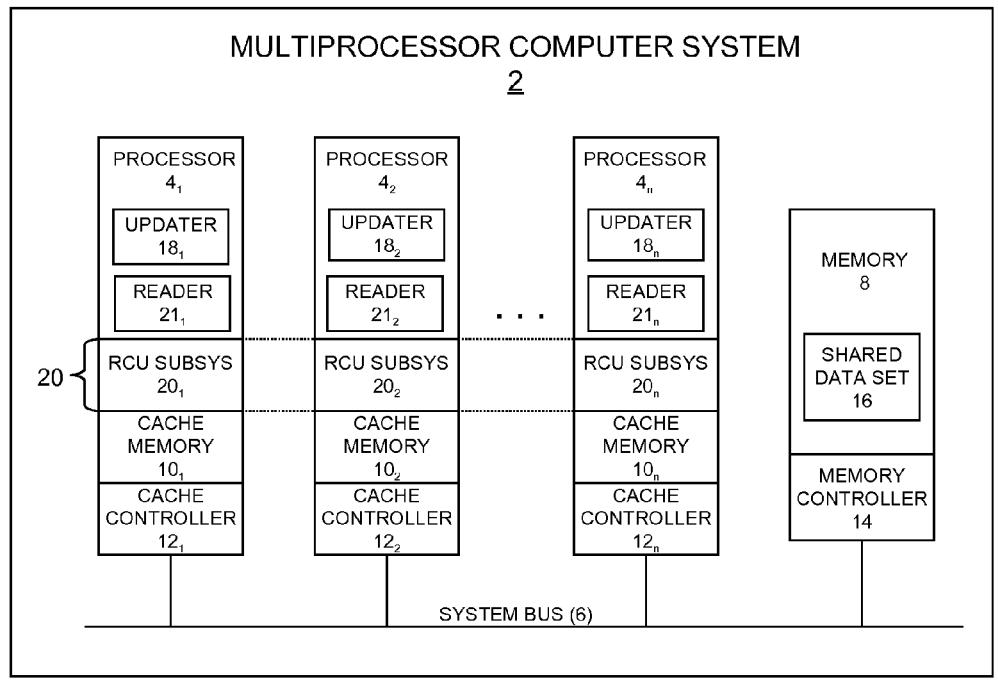
FIG. 7 is a functional block diagram showing a multiprocessor computing system.

Turning now to the figures, wherein like reference numerals represent like elements in all of the several views, FIG. 7 illustrates an example multiprocessor computer system in which the RCU grace period initialization and CPU hotplugging synchronization technique described herein may be implemented. In FIG. 7, a computer system 2 includes a plurality of processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, as previously mentioned, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 7, reference numerals $18_1$, $18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 7, reference numbers $20_1, 20_2 \ldots 20_n$ represent individual RCU instances that may respectively periodically execute on the several processors $4_1, 4_2 \ldots 4_n$. Operational details of the RCU subsystem 20 are described below.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 7, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 will occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may call an RCU primitive such as synchronize_rcu( ) or call_rcu( ) to invoke the RCU subsystem 20 to track a grace period for deferred destruction of the pre-update view of the data (second-phase update). The grace period processing performed by the RCU subsystem 20 entails starting new grace periods and detecting the end of old grace periods so that the RCU subsystem 20 knows when it is safe to free stale data (or take other actions).

Figure 8:
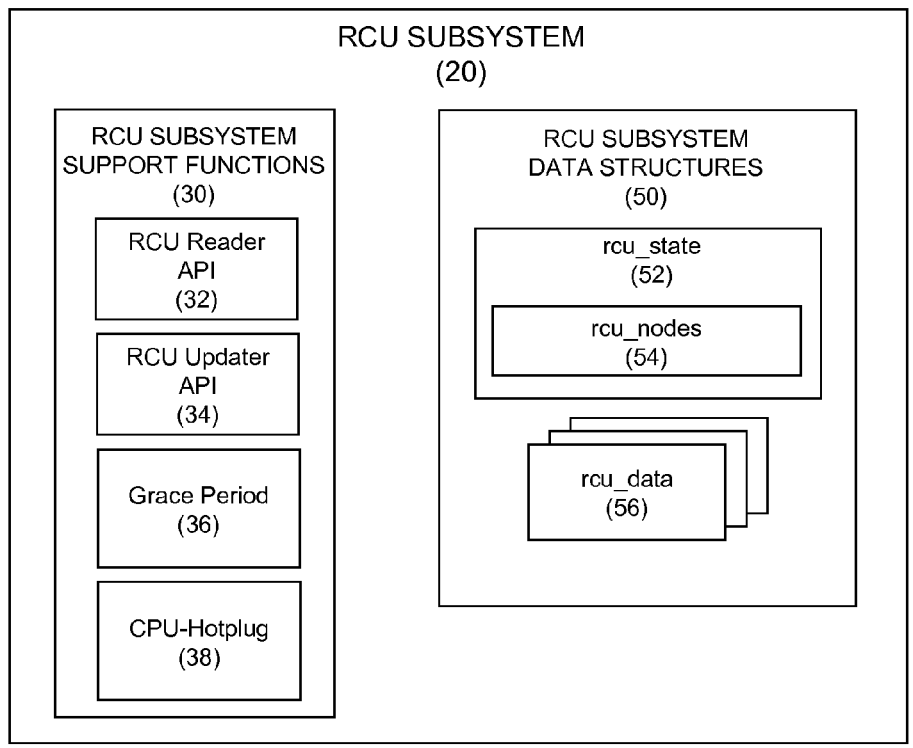
FIG. 8 is a functional block diagram showing an example RCU subsystem that may be provided in the computer system of FIG. 5.

Turning now to FIG. 8, example components of the RCU subsystem 20 are shown. Among these components is a set of RCU subsystem support functions 30, namely, an RCU reader API (Application Programming Interface) 32, an RCU updater API 34, and a set of grace period functions 36. There is also a component 38 embodying a set of CPU hotplug functions that perform RCU-related operations when offlining and onlining CPUs.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may comprise synchronization primitives such as synchronize_rcu( ) or call_rcu( ) for use by updaters 18 to defer the removal of shared data 16 that may be referenced by the readers 21 until the grace period detection component 36 determines that a grace period has elapsed.

The grace period component 36, which may be implemented as a kernel thread (e.g. a Linux® kthread), includes various functions that participate in starting new grace periods and detecting the end of old grace periods. The grace period component 36 further includes improved functionality that cooperates with corresponding improved functionality in the CPU hotplug component 38 to facilitate RCU grace period initialization in the face of potentially concurrent CPU hotplug operations, without using sleeplocks. Operational details of these improvements are described in more detail below.

With continuing reference now to FIG. 8, the RCU subsystem 20 further includes a set of RCU subsystem data structures 50. These data structures include an rcu_state structure 52 having embedded therein (e.g., as a linear array) a combining tree of rcu_node structures 54. The RCU subsystem 20 thus supports hierarchical grace period detection, and may be characterized as a hierarchical RCU implementation. The tree of rcu_node structures tracks quiescent states and CPU hotplug status. Although not shown in FIG. 8, ->qsmask and ->qsmaskinit bitmask fields may be provided at each level of the combining tree. As discussed in the "Background" section above, the ->qsmask fields indicate which CPU's quiescent states are still required in order to end a current grace period, and the ->qsmaskinit bitmask fields indicate which CPUs are offline such that quiescent states will not required during a future grace period. Leaf rcu_node structures 54 may also maintain a ->blkd_tasks list (not shown in FIG. 8) to track readers 21 that have been preempted within their RCU read-side critical sections. Each leaf rcu_node structure 54 additionally has a set of a per-processor rcu_data structures 56 assigned to it. Each rcu_data structure 56 represents one CPU in the computer system 2.

Figure 1A:
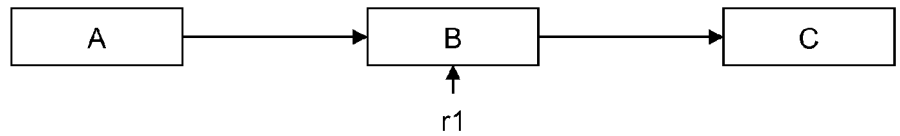
FIGS. 1A-1D are diagrammatic representations of a linked list of data elements undergoing a data element replacement according to a conventional read-copy update mechanism.
Figure 1B:
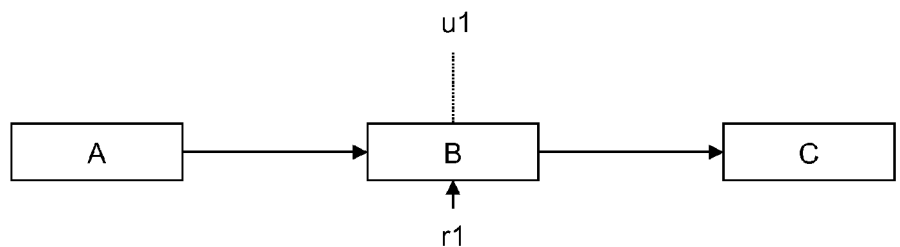
Figure 1C:
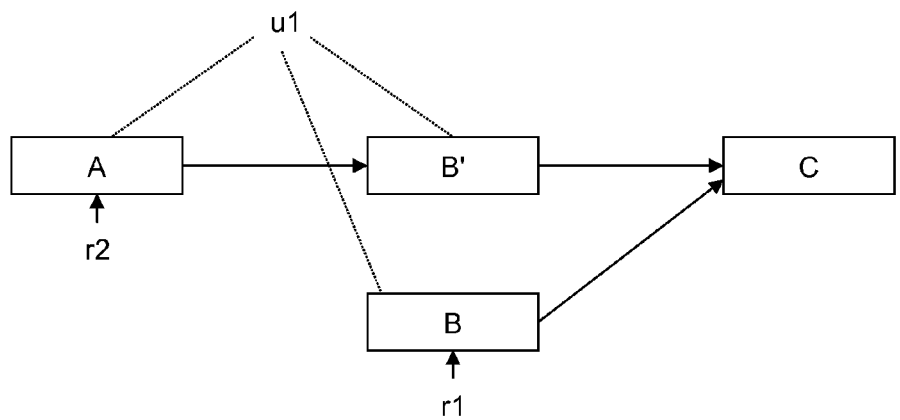
Figure 1D:
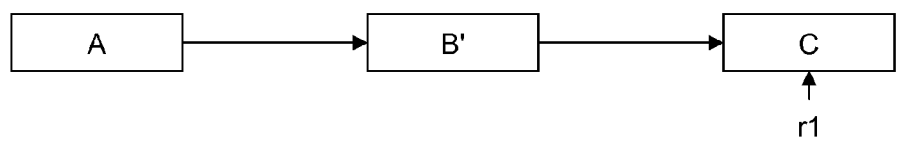
Figure 2A:
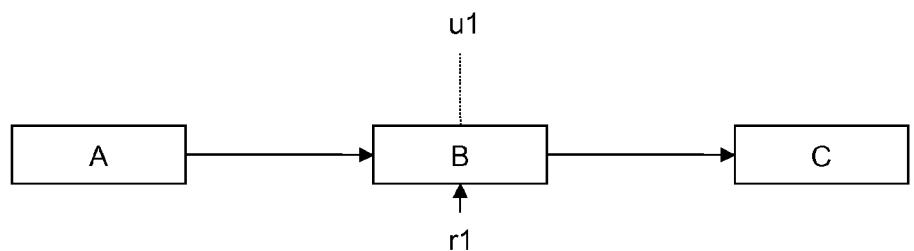
FIGS. 2A-2C are diagrammatic representations of a linked list of data elements undergoing a data element deletion according to a conventional read-copy update mechanism.
Figure 2B:
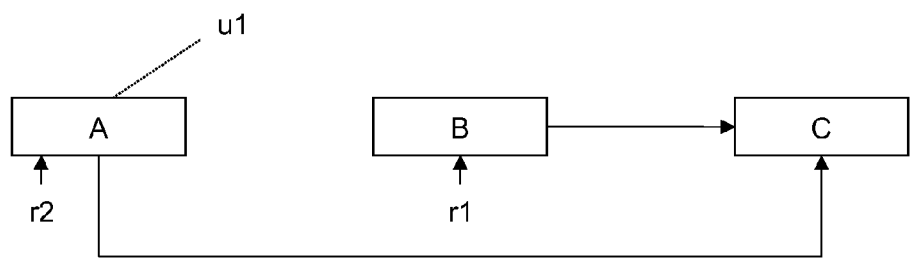
Figure 2C:
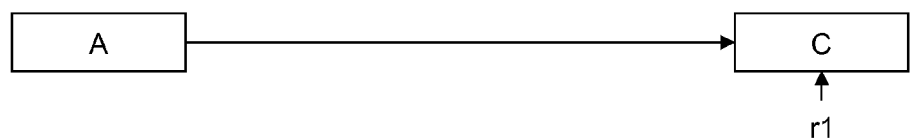
Figure 3:
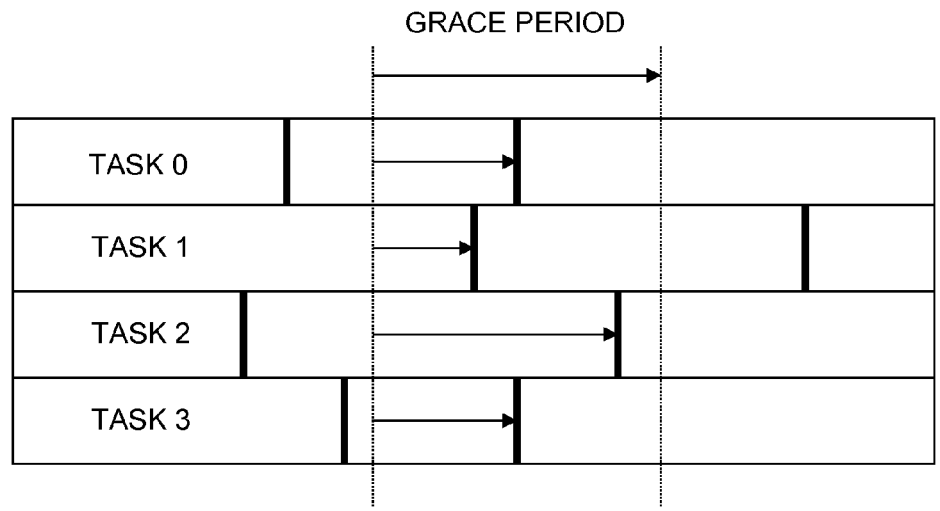
FIG. 3 is a flow diagram illustrating an example prior art grace period in which four processes pass through a quiescent state.
Figure 4:
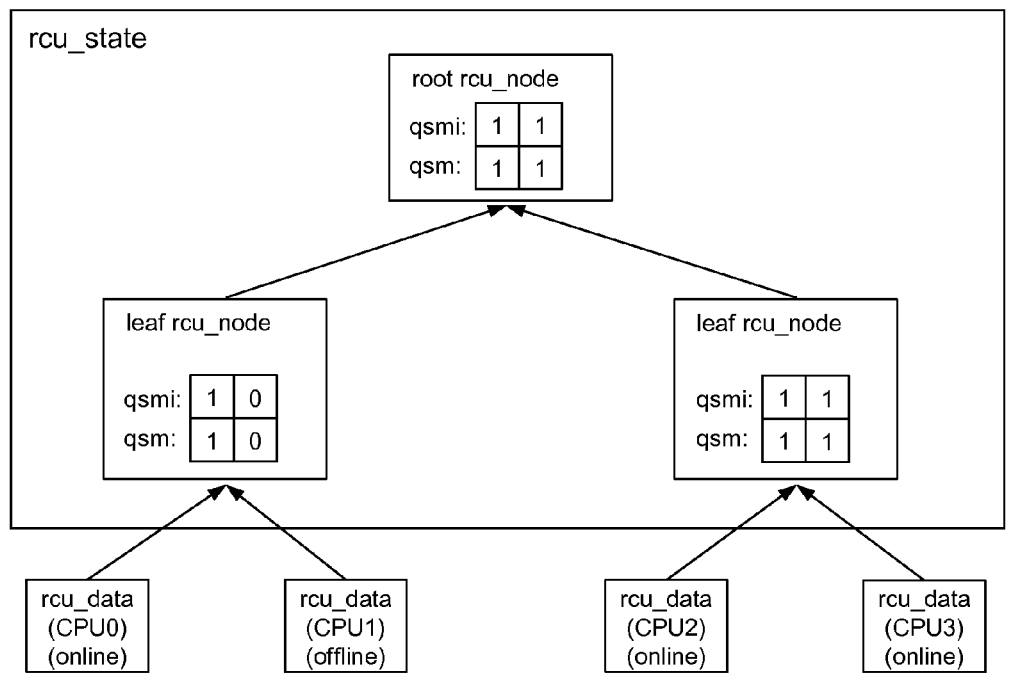
FIG. 4 is a functional block diagram showing a prior art RCU combining tree that tracks quiescent states and CPU hotplug status.
Figure 5:
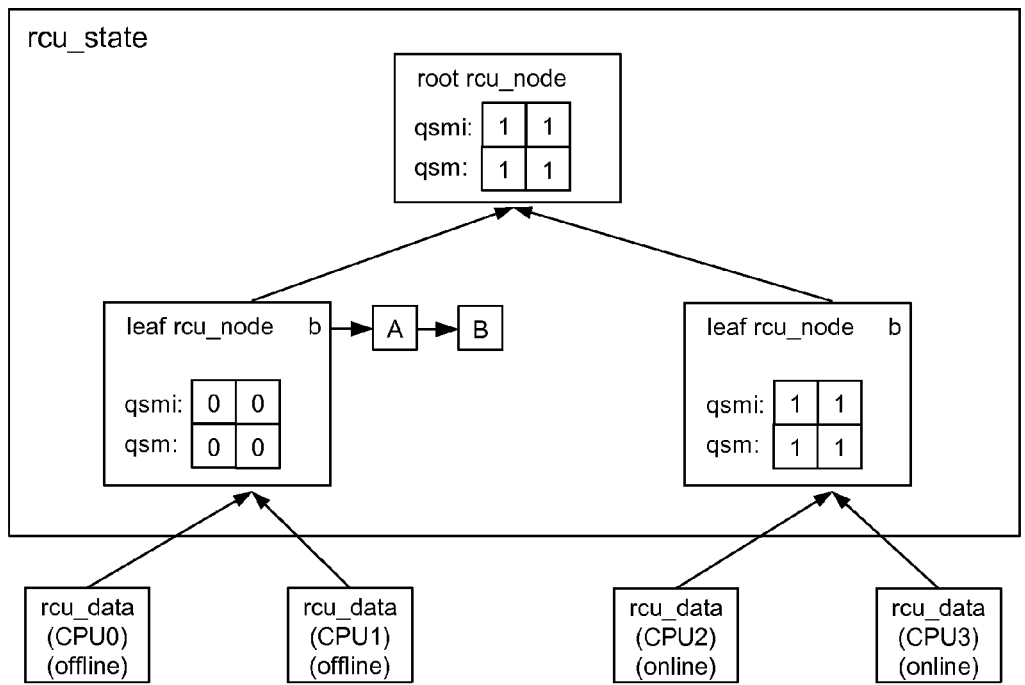
FIG. 5 is a functional block diagram showing a prior art preemptible RCU combining tree that tracks quiescent states and CPU hotplug status.
Figure 6A:
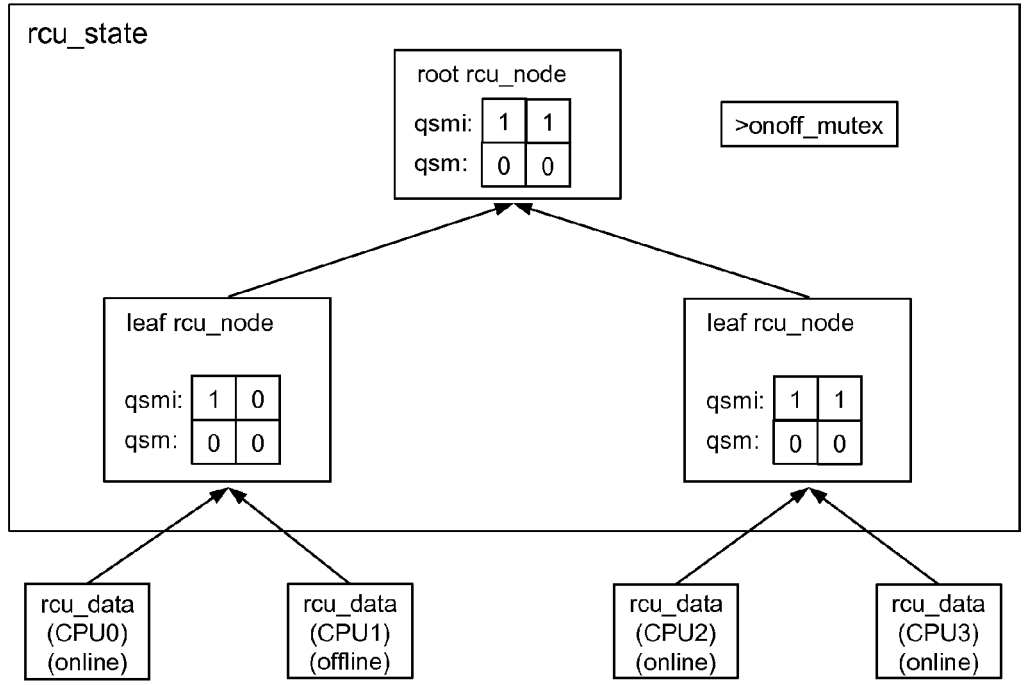
FIG. 6A-6C are functional block diagrams showing the prior art RCU combining tree of FIG. 4 during different stages of grace period initialization and CPU hotplug operations running concurrently with each other.
Figure 6B:
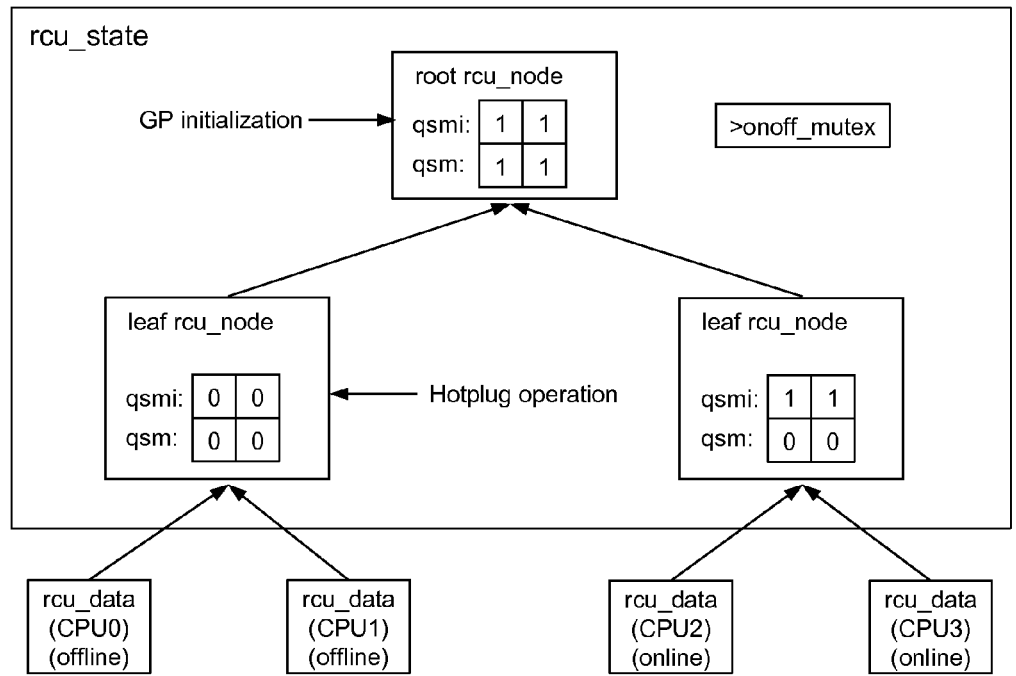
Figure 6C:
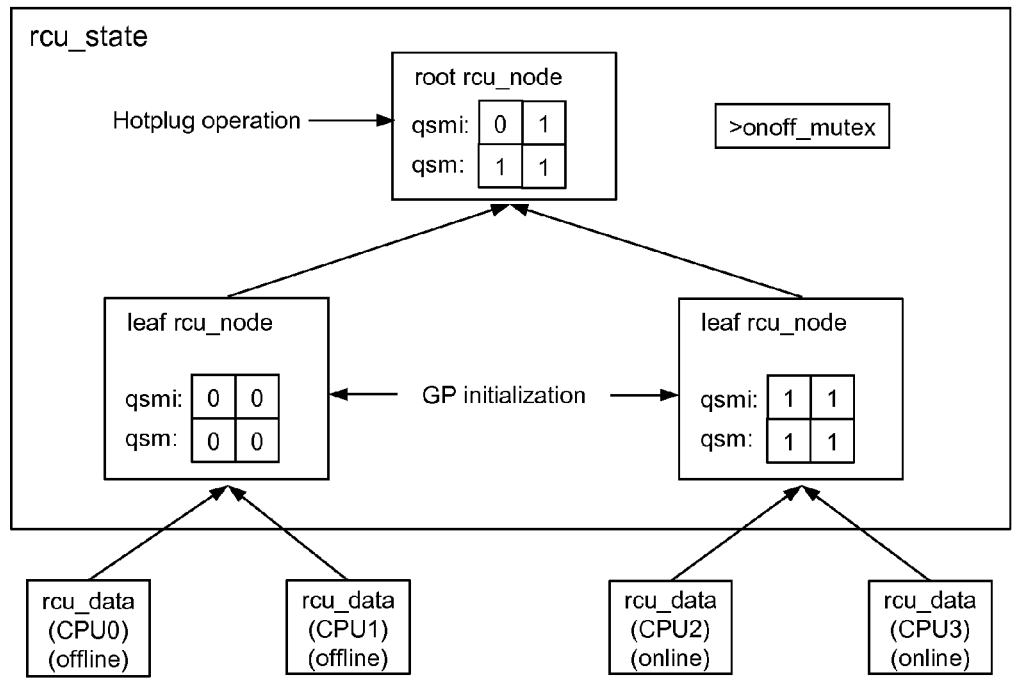

As discussed in the "Background" section above, prior art rcu_state structures have used an ->onoff_mutex sleeplock (see FIGS. 6A-6C) to synchronize grace period initialization and CPU hotplug operations. As indicated at the conclusion of the "Background" section above, applicant has observed that this synchronization strategy requires CPU hotplug offlining to be carried out in preemptible context, which rules out performing this operation from the portion of the idle loop that offline CPUs go to in order to be powered off. As a consequence, there is uncertainty in the RCU subsystem 20 as to exactly when a given CPU has gone offline.

The improved RCU grace period initialization and CPU hotplug synchronization technique disclosed herein overcomes this problem. The proposed solution recognizes that the RCU subsystem 20 only needs to know the set of online CPUs at the time a new grace period starts. This is because the RCU subsystem 20 only needs to wait for pre-existing readers, which means that it need not wait for CPUs that come online after the grace period starts. The proposed solution further recognizes that a CPU can go offline after the grace period starts, but the RCU subsystem 20 will detect this situation when forcing quiescent states, and will correctly note a quiescent state on behalf of the now-offline CPU.

Figure 9A:
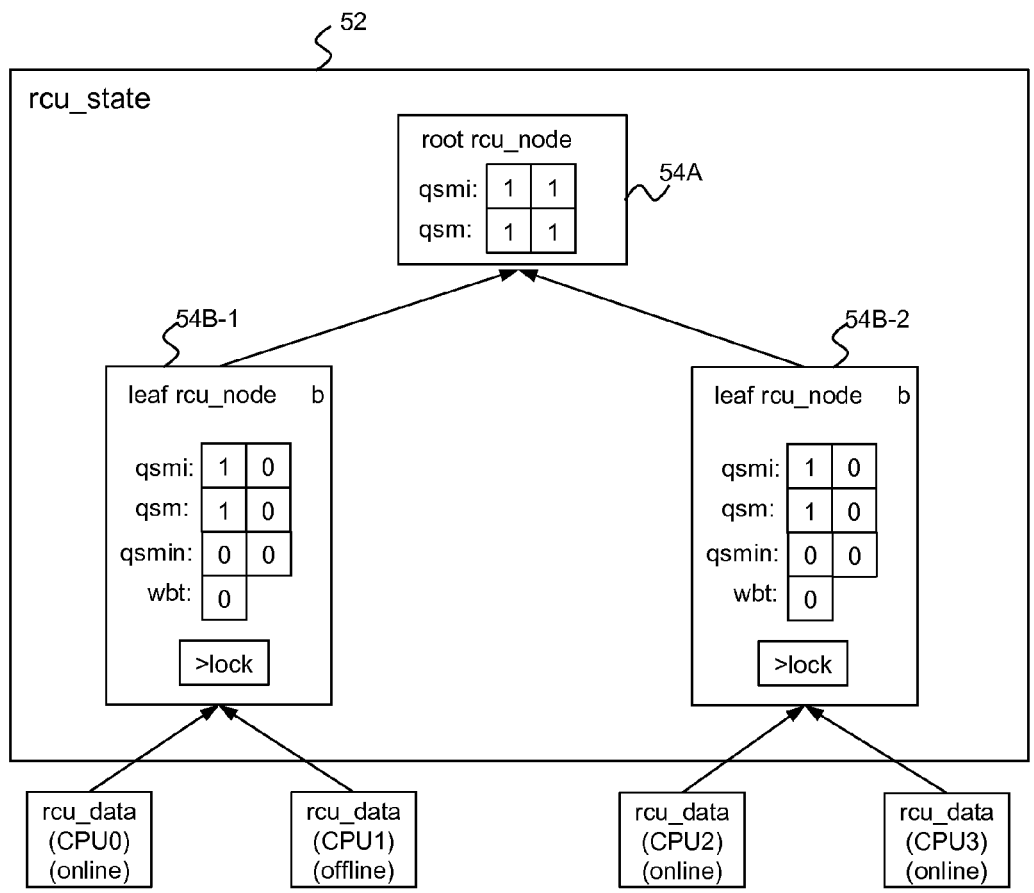
FIG. 9A is a functional block diagram showing a preemptible RCU combining tree according to a first embodiment that tracks quiescent states and CPU hotplug status without using a sleeplock to synchronize grace period initialization and CPU hotplug operations.
Figure 9B:
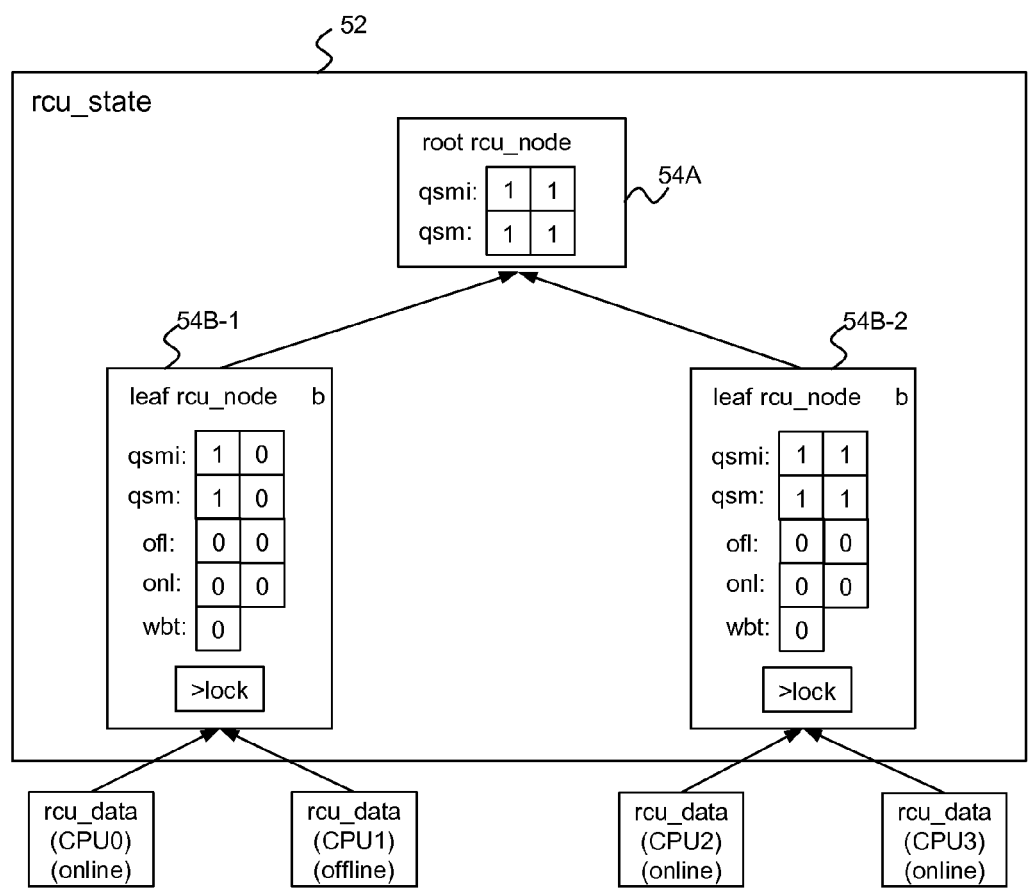
FIG. 9B is a functional block diagram showing a preemptible RCU combining tree according to a second embodiment that tracks quiescent states and CPU hotplug status without using a sleeplock to synchronize grace period initialization and CPU hotplug operations.

In an example embodiment, the leaf rcu_node structures 54 of the rcu_state structure 52 are modified to include additional fields for buffering CPU hotplug events. FIGS. 9A and 9B illustrate two example embodiments. Both figures include a root rcu_node structure 54A and two leaf rcu_node structures 54B-1 and 54B-2. In FIG. 9A, CPU hotplug events are buffered in a bitmask stored in a ->qsmaskinitnext (qsmin) field in the leaf rcu_node structures 54B-1 and 54B-2. In FIG. 9B, CPU hotplug events are buffered in pairs of bitmasks stored in ->oflmask and ->onlmask fields (ofl and onl) in the leaf rcu_node structures 54B-1 and 54B-2. The leaf rcu_node structures 54B-1 and 54B-2 also include a spinlock field that may be called ->lock. In both embodiments, the new CPU hotplug buffer bitmask fields allow the CPU hotplug component 38 to indicate a CPU's offline or online state to the RCU subsystem 20 without directly modifying any ->qsmaskinit bits. The grace period component 36 merges the CPU hotplug buffer bitmasks into the ->qsmaskinit fields at the beginning of each new RCU grace period, as part of a new RCU grace period pre-initialization operation. Details of how the CPU hotplug buffer bitmasks are handled during RCU grace period pre-initialization are described below.

A ->wait_blkd_tasks Boolean, shown by the wbt flag in FIGS. 9A and 9B, is also added to the leaf rcu_node structures 54B-1 and 54B-2. The ->wait_blkd_tasks Boolean handles the possibility that all CPUs on a given leaf rcu_node structure have gone offline, but tasks that were preempted while in an RCU read-side critical section still remain in those RCU read-side critical sections. These tasks will be recorded on a leaf rcu_node structure's ->blkd_tasks list.

When a CPU comes online via the CPU hotplug component 38, the CPU does not does not manipulate a ->qsmaskinit bit in the CPU's assigned leaf rcu_node structure 54B-1 or 54B-2. Instead, in the FIG. 9A embodiment, the CPU sets its bit in the ->qsmaskinitnext field. In the FIG. 9B embodiment, the CPU either clears its bit in the ->oflmask field (if the bit was previously set), or alternatively (if a bit was previously not set in the ->oflmask field), the CPU sets its bit in the ->onlmask field. A CPU coming online will only find its bit set in the ->oflmask field if that CPU went offline during a given RCU grace period and then comes back online before the next RCU grace period starts. On the other hand, if the CPU has been offline for more than one grace period, it will not have a bit set in the ->oflmask field, and therefore needs to set its bit in the ->onlmask field.

A CPU going offline via the CPU hotplug component 38 reverses the above process. In the FIG. 9A embodiment, the CPU clears its bit in the ->qsmaskinitnext field. In the FIG. 9B embodiment, the CPU either clears its bit in the ->onlmask field (if the bit was previously set), or alternatively (if a bit was not previously set in the ->onlmask field), the CPU sets its bit in the ->oflmask field. A CPU going offline will only find its bit set in the ->onlmask field if that CPU came online during a given RCU grace period then goes offline before the next RCU grace period starts. On the other hand, if the CPU has been online for more than one grace period, it will not have a bit set in the ->onlmask field, and therefore needs to set its bit in the ->oflmask field.

During RCU grace-period pre-initialization, the bit state of the CPU hotplug buffer bitmasks of FIG. 9A or 9B is merged into the ->qsmaskinit fields of each leaf rcu_node structure 54B-1 and 54B-2. This is handled by the grace period component 36 before it performs conventional RCU grace period initialization in which the ->qsmaskinit fields are copied to the ->qsmask fields throughout the rcu_node structure combining tree. Merging the bit state of the CPU hotplug buffer bitmasks into ->qsmaskinit bitmasks ensures that all CPUs that are online at the beginning of the grace period are properly accounted for, while also ensuring that the ->qsmaskinit bits do not change during the remainder of the grace-period initialization. In the FIG. 9A embodiment, the merge operation may simply copy the ->qsmaskinitnext field to the ->qsmaskinit field of each leaf rcu_node structure 54B-1 and 54B-2. In the FIG. 9B embodiment, the merge operation is somewhat more complex due to the fact that there are two CPU hotplug buffer bitmasks for each leaf rcu_node structure. In this case, CPU hotplug buffer bits may be set in each leaf rcu_node structure's ->qsmaskinit field by bitwise ORing the ->qsmaskinit field with the ->onlmask field (e.g., rnp->qsmaskinit|=rnp->onlmask), and by logically ANDing the ->qsmaskinit field with the bitwise NOT of the ->oflmask field (e.g., rnp->qsmaskinit &=~rnp->oflmask). The merge operation of the FIG. 9B embodiment further includes clearing the CPU hotplug buffer bitmasks following merging, such that the ->onlmask and ->oflmask fields are zeroed out at the beginning of each RCU grace period. This is not done in the FIG. 9A embodiment, such that the ->qsmaskinitnext fields always reflect the current online/offline status of their associated CPUs. Either way works well, with the FIG. 9A embodiment being somewhat more efficient than the FIG. 9B embodiment.

RCU grace period pre-initialization further entails propagating changes to a leaf rcu_node structure's ->qsmaskinit field further up the rcu_node combining tree when the value of that ->qsmaskinit field transitions to or from zero. If the value of a leaf rcu_node structure's ->qsmaskinit field transitions from zero to non-zero, the change is unconditionally propagated up the rcu_node combining tree. However, when the value transitions from non-zero to zero, this change cannot be propagated up the rcu_node tree unless and until the ->blkd_tasks list is empty. If this list is non-empty, the value of the ->wait_blkd_tasks flag (wbt in FIGS. 9A and 9B) is set to indicate a pending propagation up the tree. If the ->blkd_tasks list becomes empty while the ->wait_blkd_tasks flag is set, the change will be propagated up the rcu_node combining tree the next time that the grace period component 36 inspects the CPU hotplug buffer bitmasks during grace period initialization. Unless, that is, one of that rcu_node structures has come back online beforehand, in which case propagation is no longer appropriate. Either way, whenever the ->blkd_tasks list is seen to be empty while the ->wait_blkd_tasks flag is set, the ->wait_blkd_tasks flag is cleared.

Figure 10A:
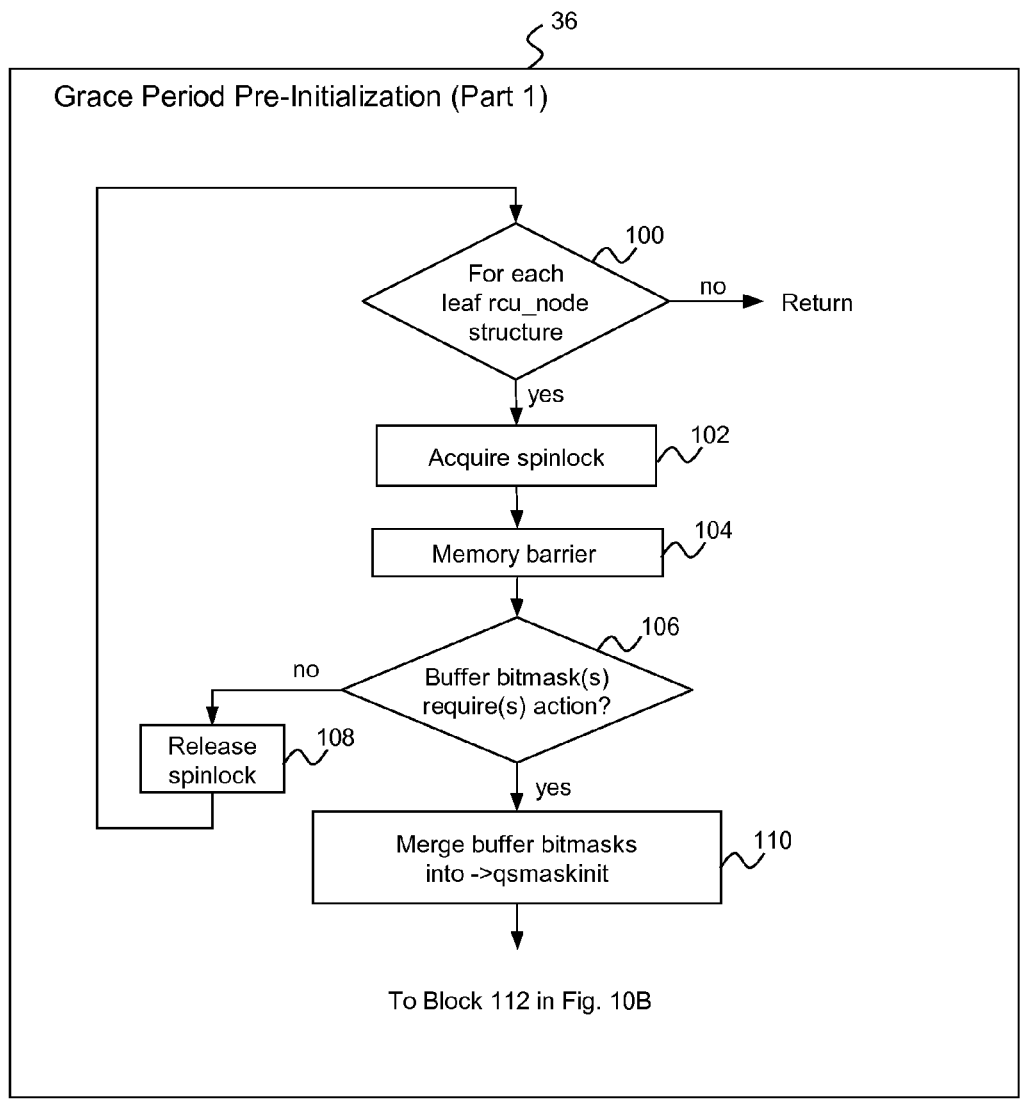
FIGS. 10A-10C collectively represent a flow diagram illustrating an example grace period pre-initialization operation that may be performed using the combining trees of FIG. 9A or FIG. 9B.
Figure 10B:
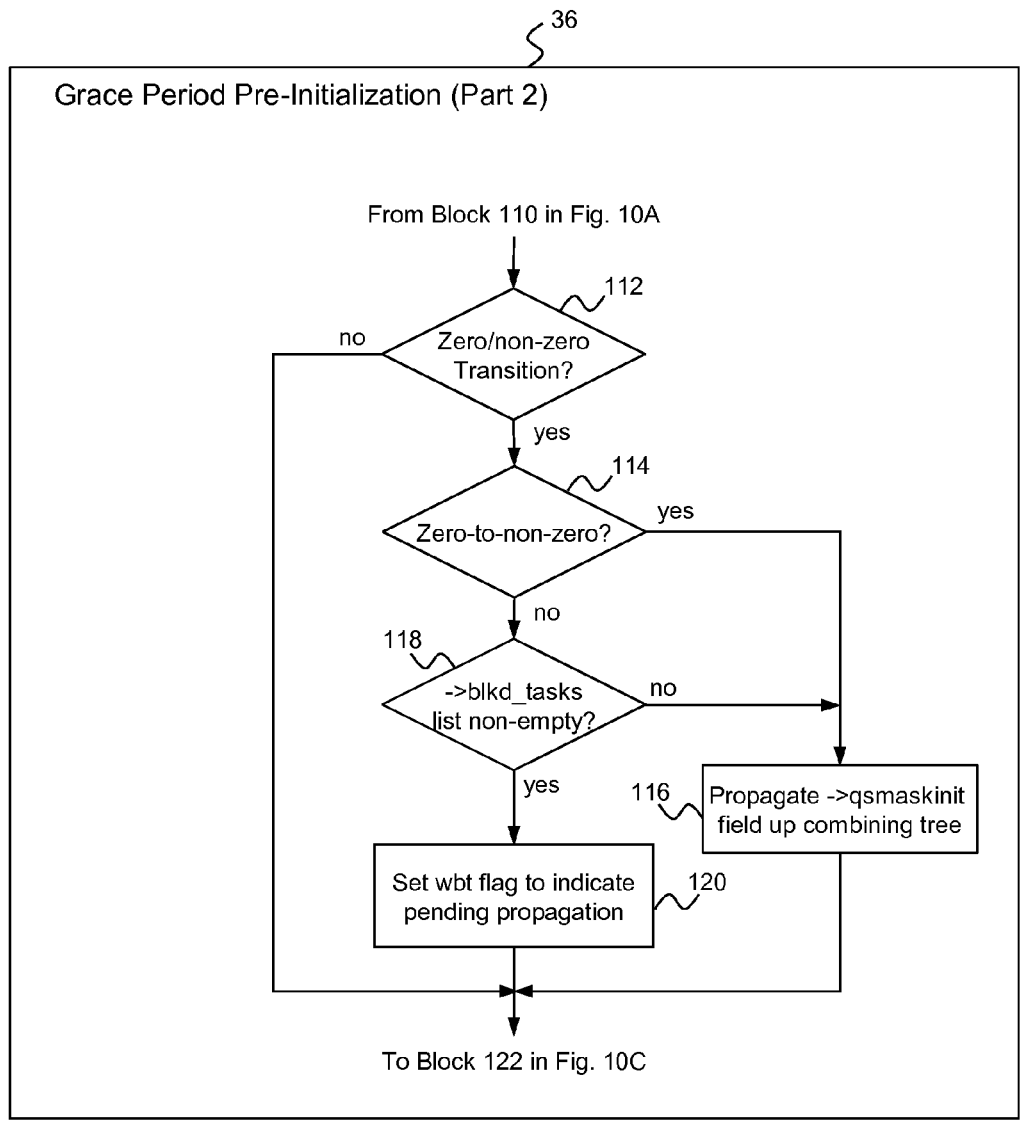
Figure 10C:
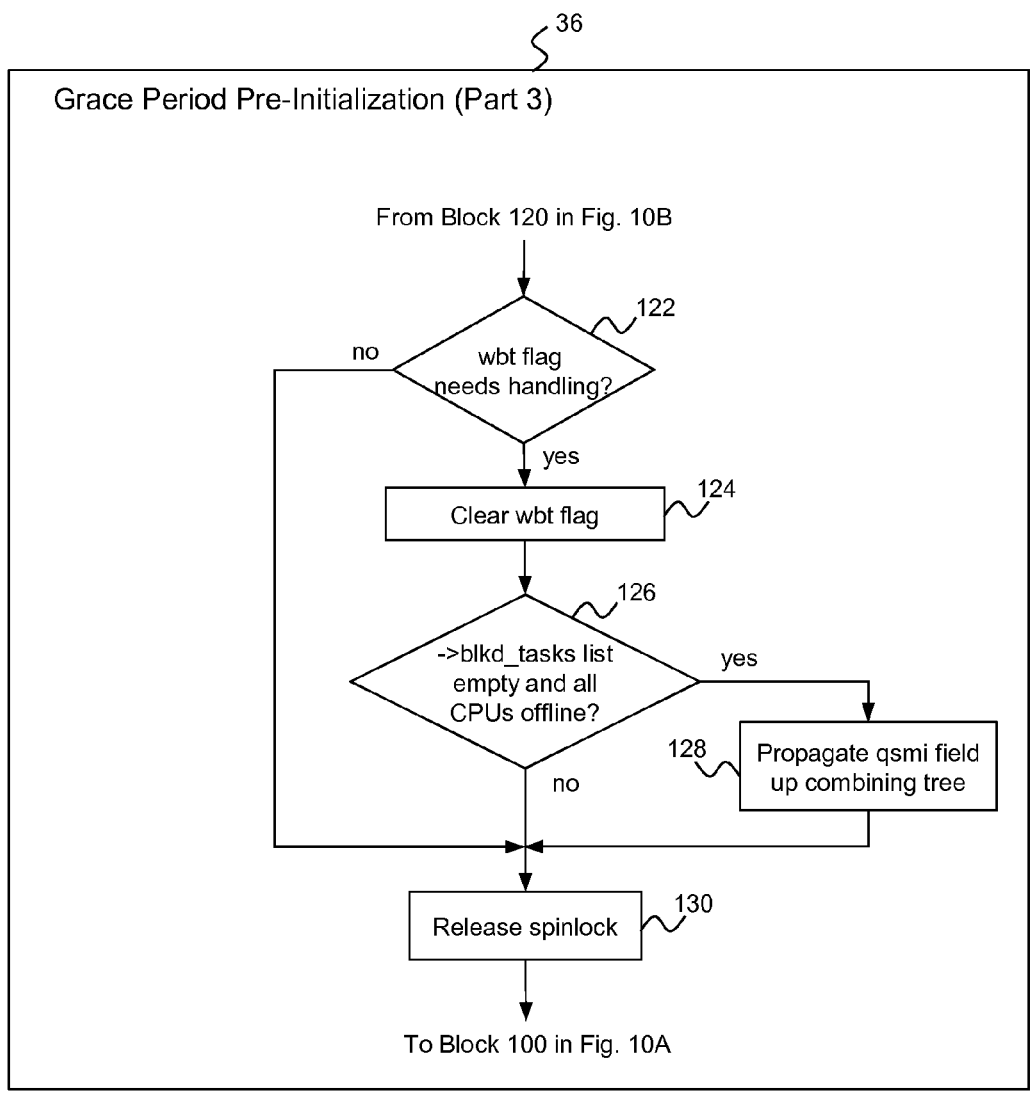

Turning now to FIGS. 10A-10C, example operations that may be performed by the grace period component 36 to implement RCU grace period pre-initialization will now be described. As noted above, these operations are performed at the leaf rcu_node level prior to conventional root-to-leaf (or leaf-to-root) grace period initialization being performed, as described in the "Background" section above. Beginning in block 100 in FIG. 10A, a processing loop scans all of the leaf rcu_node structures 54 in the rcu_state structure 52. The leaf rcu_node structure's spinlock (->lock) is acquired in block 102 and a memory barrier instruction in block 104 enforces full ordering after lock acquisition so as to implement grace period memory-ordering guarantees. If block 106 sees that there is no action to take because there are no changes indicated by the CPU hotplug buffer bitmask fields, and no pending propagation indicated by the ->wait_blkd_tasks flag, then block 108 releases this rcu_node structure's spinlock (->lock) and processing proceeds to the next rcu_node structure. Otherwise, block 110 applies the changes buffered in the CPU hotplug buffer bitmask(s) to the ->qsmaskinit field (followed by clearing the CPU hotplug buffer bitmasks in the FIG. 9B embodiment).

Block 112 in FIG. 10B checks to see if these changes represent a zero/non-zero transition for the ->qsmaskinit field. If so, if block 114 sees a zero-to-non-zero transition, block 116 propagates the ->qsmaskinit field change up the rcu_node combining tree. Otherwise, block 118 checks to see if this leaf rcu_node structure's ->blkd_tasks list is non-empty, and if so, block 120 indicates deferred propagation by setting the ->wait_blkd_tasks field. Otherwise, block 116 propagates the ->qsmaskinit field change up the rcu_node combining tree.

Whether or not block 112 detects a zero/non-zero transition, block 122 in FIG. 10C checks to see if the ->wait_blkd_tasks flag needs to be handled, which will be the case if this flag is set and either there are no longer any preempted tasks on the ->blkd_tasks list or one of the CPUs has come back online, as indicated by the ->qsmaskinit field. If so, block 124 clears the ->wait_blkd_tasks flag. If block 126 determines that the ->blkd_tasks list is empty and the ->qsmaskinit field indicates that all of this rcu_node structure's CPUs are still offline (or have all gone back offline, as the case may be), then block 128 propagates the ->qsmaskinit field change up the rcu_node combining tree and block 130 release this leaf rcu_node structure's spinlock (->lock). Block 130 is also reached if the conditions checked for in blocks 122 and 126 do not exist. Loop processing then returns to block 100 in FIG. 10A to treat the next leaf rcu_node structure 54.

Figure 11:
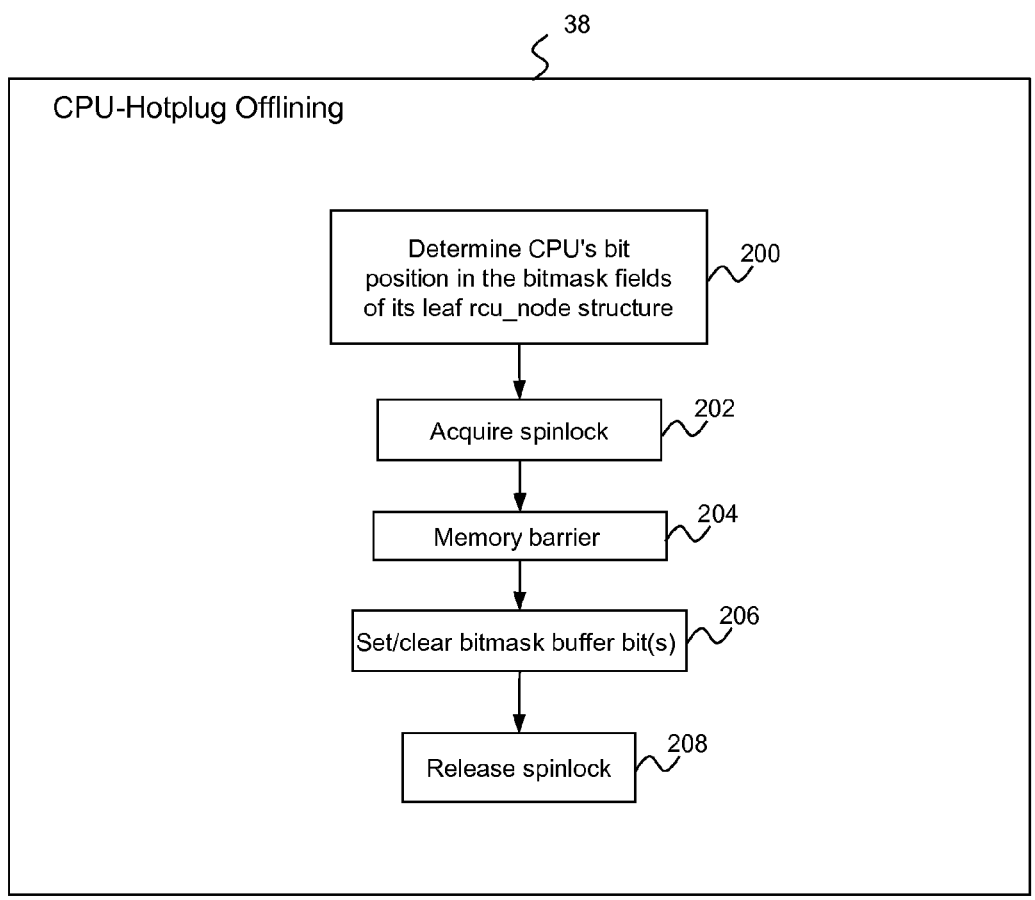
FIG. 11 is a flow diagram illustrating an example CPU hotplug offlining operation that may be performed using the combining trees of FIG. 9A or 9B.

Turning now to FIG. 11, example CPU hotplug offlining operations that may be performed by the CPU hotplug component 38 will now be described. These operations are performed by a CPU 4 that is going offline, such as part of the idle-loop processing that CPUs go to in order to be powered off. Block 200 in FIG. 11 records the outgoing CPU's bit position within the various bitmasks in the CPU's assigned leaf rcu_node structure 54. Block 202 acquires the leaf rcu_node structure's spinlock (->lock) and block 204 implements a memory barrier instruction to enforce full ordering after lock acquisition so as to implement RCU's memory-ordering guarantees. Block 206 adjusts a bit in the appropriate CPU hotplug buffer bitmask. In the FIG. 9A embodiment, block 206 will set this CPU's bit in the leaf rcu_node structure's ->qsmaskinitnext field. In the FIG. 9B embodiment, block 206 will check to see if this CPU's bit is set in the leaf rcu_node structure's ->onlmask field, which would indicate that this CPU has come online since the beginning of the last grace period. If so, block 206 clears the ->onlmask bit. Otherwise, block 206 sets this CPU's bit in the leaf rcu_node structure's ->oflmask field. Block 208 releases the leaf rcu_node structure's spinlock (->lock).

Note that nothing in the the CPU hotplug offlining operation code interferes with the setting of ->qsmask fields with the corresponding ->qsmaskinit fields by the grace period component 36 during grace period initialization, and that the leaf rcu_node structure's spinlock (->lock) synchronizes the CPU hotplug offlining operation with the grace period component's pre-initialization operation described above in connection with FIGS. 10A-10C. Although this spinlock disables interrupts, both operations are fast enough that the latency impact is negligible.

Figure 12:
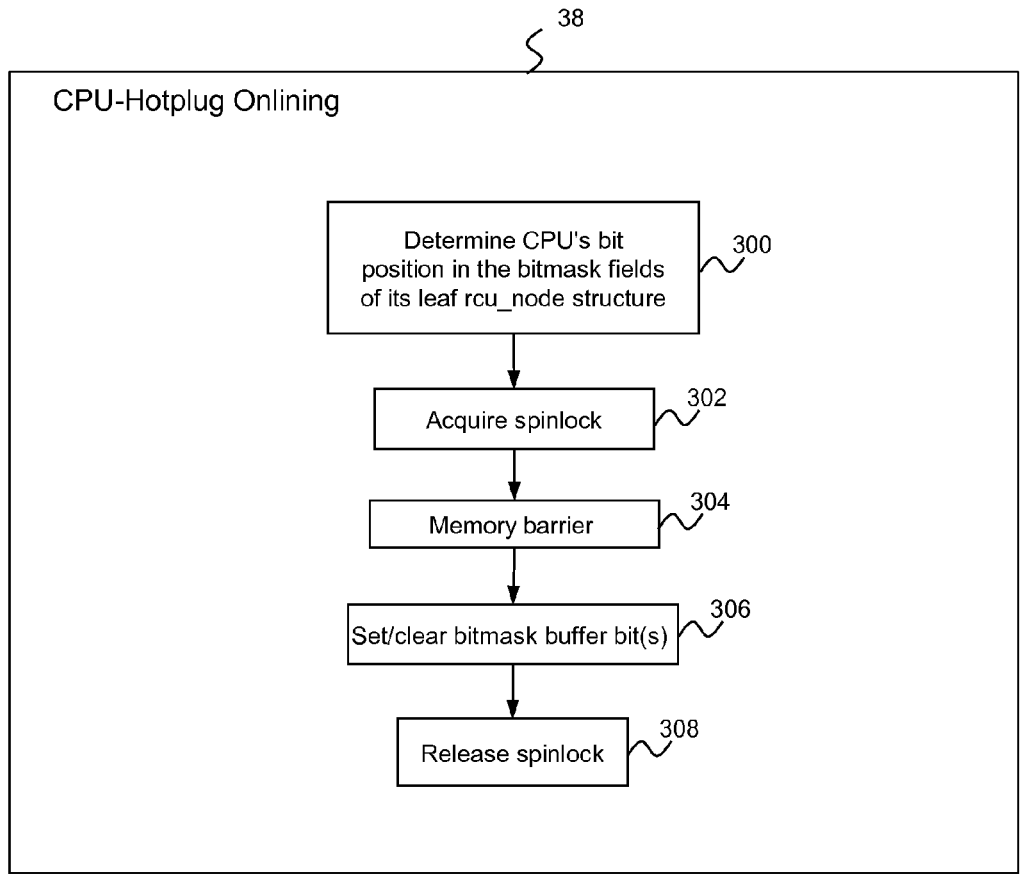
FIG. 12 is a flow diagram illustrating an example CPU hotplug onlining operation that may be performed using the combining trees of FIG. 9A or 9B.

Turning now to FIG. 12, example CPU hotplug onlining operations that may be performed by the CPU hotplug component 38 will now be described. These operations are performed by a CPU 4 that is coming online after having been previously offlined. Block 300 in FIG. 12 determines the incoming CPU's bit position within the various bitmasks in the CPU's assigned leaf rcu_node structure 54. Block 302 acquires the leaf rcu_node structure's spinlock (->lock) and block 304 implements a memory barrier instruction to enforce full ordering after lock acquisition so as to implement RCU's memory-ordering guarantees.

Block 306 adjusts a bit in the appropriate CPU hotplug buffer bitmask. In the FIG. 9A embodiment, block 306 will clear this CPU's bit in the leaf rcu_node structure's ->qsmaskinitnext field. In the FIG. 9B embodiment, block 306 checks to see if this CPU's bit is set in the leaf rcu_node structure's ->oflmask field, which would indicate that this CPU went offline since the beginning of the last grace period and is now coming online again. If so, block 306 clears this CPU's bit in the ->oflmask field. Otherwise, block 306 sets this CPU's bit in the leaf rcu_node structure's ->onlmask field. Block 308 releases the leaf rcu_node structure's spinlock (->lock).

Accordingly, a technique for synchronizing RCU grace period initialization and CPU hotplug operations without using a sleeplock has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 7-12.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 13:
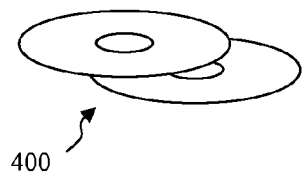
FIG. 13 is a diagrammatic illustration showing example computer readable data storage media that may be used to provide a computer program product in accordance with the present disclosure.

Example computer readable data storage media for storing such program instructions are shown by reference numerals 8 (memory) and 10 (cache) of the computer system 2 of FIG. 7. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 400 in FIG. 13.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method, comprising:
providing a combining tree to track RCU grace periods and CPU hotplug activity, said combining tree comprising:
a root node at a root level of said combining tree and a set of lower level nodes in one or more lower levels of said combining tree, said lower level nodes including a set of two or more leaf nodes at a leaf level of said combining tree, and said lower level nodes optionally including zero or more intermediate nodes in zero or more intermediate levels of said combining tree;
each said leaf node being accessed by a set of assigned CPUs and referencing an assigned higher level node in said combining tree that is said root node if there are two levels in said combining tree or that is one of said intermediate nodes if there are more than two levels in said combining tree;
said root node being referenced by a set of assigned lower level nodes that are said leaf nodes if there are two levels in said combining tree or that are one or more levels of said intermediate nodes if there are more than two levels in said combining tree; and
each node in said combining tree having a first bitmask whose bits indicate online or offline status of said CPUs, and a second bitmask whose bits indicate RCU quiescent state status of said CPUs, each bitmask bit in said leaf nodes directly corresponding to one of said CPUs, and each bitmask bit in said higher level nodes directly corresponding to an assigned lower level node and indirectly corresponding to CPUs represented by said assigned lower level node;
periodically performing RCU grace period initialization in which, for each said node, said first bitmask is copied to said second bitmask;
periodically performing CPU hotplug operations that result in said CPUs coming online or going offline, said CPU hotplug operations indicating online or offline status of said CPUs to said associated leaf nodes to which said CPUs are assigned, said online or offline status being indicated without manipulating any bits in said first bitmask of said leaf nodes;
prior to each RCU grace period initialization, performing RCU grace period pre-initialization at each of said leaf nodes, said RCU grace period pre-initialization including (1) updating said first bitmask by setting or clearing bits to account for said leaf node's assigned CPUs that have come online or gone offline as a result of said CPU hotplug operations, and (2) if said updating said first bitmask results in said first bitmask transitioning from a state in which at least one bit is set to a cleared state, or from a cleared state to a state in which at least one bit is set, conditionally propagating said state change to said leaf node's assigned higher level node by setting or clearing a bit that corresponds to said leaf node in said higher level node's first bitmask; and
synchronizing access to said leaf nodes by said RCU grace period pre-initialization and said CPU hotplug operations without using a sleeplock that prevents said RCU grace-period initialization from running concurrently with manipulations of said combining tree by said CPU hotplug operations.

2. The method of claim 1, wherein said synchronizing access to said leaf nodes by said RCU grace period pre-initialization and said CPU hotplug operations uses a spinlock associated with each of said leaf nodes.

3. The method of claim 1, wherein said CPU hotplug operations indicate online or offline status of said CPUs by manipulating CPU hotplug buffer bits provided in each of said leaf nodes that are not part of said first bitmask or said second bitmask, and wherein said RCU grace period initialization performs said updating of said first bitmask in said leaf nodes by merging said CPU hotplug buffer bits into said first bitmask.

4. The method of claim 3, wherein said CPU hotplug buffer bits are part of a single CPU hotplug buffer bitmask in each of said leaf nodes that continuously indicates CPU hotplug state of CPUs assigned to said leaf nodes.

5. The method of claim 3, wherein said CPU hotplug buffer bits are part of first and second CPU hotplug buffer bitmasks in each of said leaf nodes that are cleared when said first bitmask is updated, said first CPU hotplug buffer bitmask being an online-indicating bitmask and said second CPU hotplug buffer bitmask being an offline-indicating bitmask.

6. The method of claim 5, wherein said CPU hotplug operations manipulate said CPU hotplug buffer bits when said CPUs goes offline by clearing said CPU hotplug buffer bits in said online-indicating bitmask if set, and otherwise setting said CPU hotplug buffer bits in said offline-indicating bitmask, and wherein said CPU hotplug operations manipulate said CPU hotplug buffer bits when said CPUs come online by clearing said CPU hotplug buffer bits in said offline-indicating bitmask if set, and otherwise setting said CPU hotplug buffer bits in said online-indicating bitmask.

7. The method of claim 1, wherein said RCU pre-initialization conditionally reports said state change to said leaf node's assigned higher level node based on a condition that there are no blocked tasks associated with said leaf node that were preempted while in an RCU critical section.

* * * * *